(12) United States Patent
Janssens et al.

(10) Patent No.: US 6,797,359 B2
(45) Date of Patent: Sep. 28, 2004

(54) MULTILAYER, METALIZED OR CERAMIC-COATED, SEALABLE, BIAXIALLY ORIENTED POLYESTER FILM, ITS USE, AND PROCESS FOR ITS PRODUCTION

(75) Inventors: Bart Janssens, Wiesbaden (DE); Herbert Peiffer, Mainz (DE); Stefan Bartsch, Wiesbaden (DE)

(73) Assignee: Mitsubishi Polyester Film GmbH, Wiesbaden (DE)

( * ) Notice: Subject to any disclaimer, the term of this patent is extended or adjusted under 35 U.S.C. 154(b) by 0 days.

(21) Appl. No.: 10/611,003

(22) Filed: Jul. 1, 2003

(65) Prior Publication Data

US 2004/0009355 A1 Jan. 15, 2004

(30) Foreign Application Priority Data

Jul. 12, 2002 (DE) ......................................... 102 31 594

(51) Int. Cl.$^7$ ..................... B32B 27/08; B32B 27/18; B32B 27/20; B32B 27/36; B32B 31/30
(52) U.S. Cl. ..................... 428/141; 428/213; 428/215; 428/216; 428/323; 428/331; 428/334; 428/336; 428/430; 428/446; 428/457; 428/458; 428/480; 428/694 SG; 428/910; 428/346; 428/347; 428/349; 264/288.4; 264/289.3; 264/290.2
(58) Field of Search ................................ 428/141, 212, 428/213, 215, 216, 323, 331, 334, 335, 336, 343, 346, 347, 349, 430, 446, 457, 458, 480, 694 ST, 694 SG, 910; 264/288.4, 289.3, 290.2

(56) References Cited

U.S. PATENT DOCUMENTS

| | | | | |
|---|---|---|---|---|
| 4,198,458 A | * | 4/1980 | Mitsuishi et al. | 428/212 |
| 5,096,784 A | * | 3/1992 | Culbertson et al. | 428/482 |
| 5,364,698 A | * | 11/1994 | Kotani | 428/323 |
| 5,948,525 A | * | 9/1999 | Kimura et al. | 428/339 |
| 6,048,626 A | * | 4/2000 | Tsuzuki et al. | 428/480 |
| 6,068,909 A | * | 5/2000 | Koseki et al. | 428/141 |
| 6,607,808 B2 | * | 8/2003 | Peiffer et al. | 428/141 |
| 6,627,295 B2 | * | 9/2003 | Peiffer et al. | 428/141 |
| 2002/0015835 A1 | * | 2/2002 | Peiffer et al. | 428/216 |
| 2002/0068158 A1 | * | 6/2002 | Peiffer et al. | 428/220 |
| 2002/0071945 A1 | * | 6/2002 | Peiffer et al. | 428/220 |
| 2004/0009342 A1 | * | 1/2004 | Janssens et al. | 428/323 |
| 2004/0009355 A1 | * | 1/2004 | Janssens et al. | 428/430 |

FOREIGN PATENT DOCUMENTS

| | | | | |
|---|---|---|---|---|
| DE | 1 465 973 A1 | 3/1977 | | B29D/9/00 |
| DE | 100 07 724 A1 | 8/2001 | | B32B/27/36 |
| EP | 0 035 835 A1 | 9/1981 | | B32B/27/08 |
| EP | 0 144 978 A2 | 6/1985 | | H03K/17/08 |
| EP | 0 379 190 A2 | 7/1990 | | B32B/27/36 |
| EP | 0 432 886 A2 | 6/1991 | | B32B/27/08 |
| EP | 0 515 096 A2 | 11/1992 | | B32B/3/26 |
| EP | 1 138 480 A2 | 10/2001 | | B32B/27/36 |
| EP | 1 197 326 A1 | 4/2002 | | B32B/27/36 |
| EP | 1 197 327 A1 | * | 4/2002 | |
| EP | 1 197 328 A1 | * | 4/2002 | |
| WO | WO 98/06575 A1 | 2/1998 | | B32B/27/36 |

OTHER PUBLICATIONS

Schimtz, Peter et al., "Films." Ullmann's Encyclopedia of Industrial Chemistry, 5th Ed., vol. A11 (1988), pp. 85–95, 105–106, 108–110.*

* cited by examiner

Primary Examiner—Vivian Chen
(74) Attorney, Agent, or Firm—ProPat, L.L.C.

(57) ABSTRACT

The invention relates to a metalized or ceramic-coated, biaxially oriented, sealable polyester film with at least one base layer (B), with a sealable outer layer (A), and with a further non-sealable outer layer (C). The sealable outer layer (A) has a minimum sealing temperature (fin) of not more than 110° C. and a seal seam strength (fin) of at least 1.3 N/15 mm of film width. The two outer layers (A) and (C) are characterized by particular features. The film of the invention is particularly suitable for use in flexible packaging, and particularly and specifically for use on systems which operate in a vacuum.

9 Claims, 2 Drawing Sheets

MULTILAYER, METALIZED OR CERAMIC-COATED, SEALABLE, BIAXIALLY ORIENTED POLYESTER FILM, ITS USE, AND PROCESS FOR ITS PRODUCTION

The invention relates to a metalized or ceramic-coated, sealable, coextruded, biaxially oriented polyester film composed of at least one base layer (B) and of outer layers (A) and (C), applied to the two sides of this base layer. The outer layer (A) is sealable, and the outer layer (C) has been metalized or ceramic-coated. The two outer layers (A) and (C) of the film are characterized by certain inventive features. The invention further relates to the use of the metalized or ceramic-coated film, and to a process for its production.

BACKGROUND OF THE INVENTION

Sealable, biaxially oriented polyester films are known. These known films either have good sealing performance or good optical properties, or acceptable processing performance.

GB-A 1 465 973 describes a coextruded, two-layer polyester film in which one layer is composed of isophthalic acid-containing and terephthalic acid-containing copolyesters and in which the other layer is composed of polyethylene terephthalate. The specification gives no useful information concerning the sealing performance of the film. Lack of pigmentation means that the process for producing the film is not reliable (the film cannot be wound) and that there are limitations on further processing of the film. The film can certainly not be further processed on systems which operate using a vacuum (metalization, coating with ceramic materials, etc.). It is entirely unsuitable for metalizing or for application of a ceramic coating.

EP-A-0 035 835 describes a coextruded sealable polyester film which has particles admixed in the sealable layer to improve winding and processing performance, the median size of these particles exceeding the thickness of the sealable layer. The particulate additives form surface protrusions which prevent undesired blocking and sticking of the film to rollers or guides. No further detail is given concerning incorporation of antiblocking agents in the other, non-sealable layer of the film. If no antiblocking agents are present in this layer, the film has restricted further processability, and especially has restricted capability for coating in a vacuum. The preferred use of bimodal particle systems makes the distribution of particle diameter very broad. This, together with the concentrations stated in the examples of the specification, impairs the sealing performance of the film. The specification gives no information on the sealing temperature range, in particular on the minimum sealing temperature (MST) of the film. Seal seam strength is measured at 140° C. and is in the range from 85 to 120 N/m (corresponding 1.275–1.8 N/15 mm of film width). In addition, the film has unsatisfactory optical properties. The haze of the film is in the range from 5 to 15%, and this is markedly too high for most applications.

EP-0 379190 discloses a coextruded polyester film which has a sealable layer whose sealing energy is greater than 400 g·cm/15 mm. The sealable layer comprises inorganic, or else additionally organic particles, added at a concentration of from 0.01 to 5% to the sealable layer. The diameter of these particles is smaller than the thickness of the sealable layer, but no definitive information is given on the absolute size of the particles. In the examples, the diameter varies from 2 to 3.5 μm. In the preferred embodiment, the particles are monodispersed and almost spherical. The base layer may likewise comprise particulate additives of this type. However, that specification gives no teaching concerning, for example, how the base is to be pigmented in order to make the sealable film reliably processable on systems operating in a vacuum. The capability of the film for, for example, vacuum-coating is therefore non-existent or only very restricted.

EP-A-0 432 886 describes a coextruded multilayer polyester film which has a first surface on which a sealable layer has been arranged and a second surface on which an acrylate layer has been arranged. Here, too, the sealable outer layer may be composed of isophthalic acid-containing and terephthalic acid-containing copolyesters. The reverse-side coating gives the film improved processing performance. The specification gives no information concerning the sealing range of the film. Seal seam strength is measured at 140° C. For a sealing layer of thickness 11 μm the seal seam strength given is 761.5 N/m (corresponding to 11.4 N/15 mm of film width). A disadvantage of the reverse-side acrylate coating is that this side has only low metal adhesion and therefore is relatively unsuitable for metalization. In addition, this side is not sealable with respect to the sealable outer layer, whereas this would be an advantage in the case of strip metalization. This limits the field of application of the film.

EP-A-0 515 096 describes a coextruded, multilayer sealable polyester film which comprises an additional additive on the sealable layer, and which has appropriate topography (number of elevations and range for the average height of the elevations). The additive may comprise inorganic particles, for example, and is preferably applied in an aqueous layer to the film during its production. However, the additive (=antiblocking agent) may also be directly incorporated into the sealable layer. The result is said to be that the film retains good sealing properties and processes well. The reverse side of the film preferably comprises only very few, relatively small, particles, which pass into this layer mainly via the regrind. The specification gives no information concerning the sealing temperature range of the film. Seal seam strength is measured at 140° C. and is more than 200 N/m (corresponding to 3 N/15 mm of film width). For a sealing layer of thickness 3 μm the seal seam strength given is 275 N/m (corresponding to 4.125 N/15 mm of film width). The film has only limited suitability for further processing on systems which operate in a vacuum (physical vapor deposition (PVD) processes, such as metalization and coating with ceramic substances). The reasons for this are the low roughness of the hot-sealable layer, the low average height of the elevations of the particles present in this layer, and the provision of only a low concentration (e.g. via the regrind) of antiblocking agents in the other, non-sealable layer of the film. In addition, the optical properties of the film are unsatisfactory. The haze of the film is greater than 3%, and this is too high for many applications.

WO 98/06575 describes a coextruded multilayer polyester film which comprises a sealable outer layer and a non-sealable base layer. The base layer here may be composed of one or more layers, one of the layers being in contact with the sealable layer. The other (exterior) layer then forms the second non-sealable outer layer. Here, too, the sealable outer layer may be composed of isophthalic acid-containing and terephthalic acid-containing copolyesters, but no antiblocking particles are present in these. In addition, the film also comprises at least one UV absorber, which is added to the base layer in a weight ratio of from 0.1 to 10%. The base layer of this film has conventional antiblocking agents. The film has good sealability, but is relatively unsuitable for metalization. In addition, it has shortcomings in optical properties (gloss and haze).

EP-A 1 138 480 describes a coextruded, biaxially oriented, sealable polyester film with at least one base layer (B), with a sealable outer layer (A), and with another outer layer (C). The sealable outer layer (A) has a minimum sealing temperature of not more than 110° C., and a seal seam strength of at least 1.3 N/15 mm of film width, and is also characterized by appropriate features with regard to the topography of the two outer layers (A) and (C). The relatively smooth sealable layer, which in comparison comprises only relatively few antiblocking particles, has excellent sealing properties and is easy to produce, and has good processability (printing, cutting, laminating, etc.). It has no capability, or only very restricted capability, for use in processing on systems operating in a vacuum.

It was therefore an object of the present invention to provide a metalized or ceramic-coated, coextruded, sealable, biaxially oriented polyester film which does not have the disadvantages of the prior-art films mentioned, and which in particular has very good processability on systems which operate in a vacuum (metalization, coating with ceramic substances, and in general the use of PVD processes and chemical vapor deposition (CVD) processes), and which has very good optical properties. For example, the film is intended not to block during coating with ceramic substances (e.g. $SiO_x$, $Al_2O_3$) in vacuum, and is intended to give good winding performance in those processes. This applies both to the unwinding of the film prior to the coating process and also to the winding-up of the film after the coating process. Blocking of the two surfaces of the film after the coating process can cause the (sealable) reverse side of the film to "stick" to the coated (non-sealable) side, and this is undesirable. On unwinding of the blocked roll (where the blocking sites generally cover parts of the film surface and mostly have random distribution), the material can be completely torn away from the film surface and transferred to the other, sealable film surface, and this is likewise undesirable. In addition, the blocking of the two surfaces of the film during the subsequent steps of processing can lead to break-off of the film web. The film is also intended to have good sealability, the intention here being that the sealable layer (A) be sealable with respect to itself (fin sealing) and also with respect to the reverse side (non-sealable side (C)) (lap sealing). This is important in the process known as strip metalization, or in partial metalization of the film (where, for example, after metalization the film is partially demetalized by using specific processes). A further intention is to ensure that cut material arising during production of the film can be returned to the production process as regrind in amounts of up to 60% by weight, based on the total weight of the film, without any significant resultant adverse effect on the physical and optical properties of the film. In summary, the properties which were in particular to be improved over (metalized or ceramic-coated) prior-art films were the following:

the properties needed for good processing of the film in a vacuum and in the subsequent steps of processing winding, in particular during processing of the film in a vacuum and during further processing in subsequent processing steps blocking performance of the two surfaces of the film, in particular after metalization or after ceramic coating optical properties of the metalized or ceramic-coated film, in particular gloss.

BRIEF DESCRIPTIONS OF THE INVENTION

Figure 1:
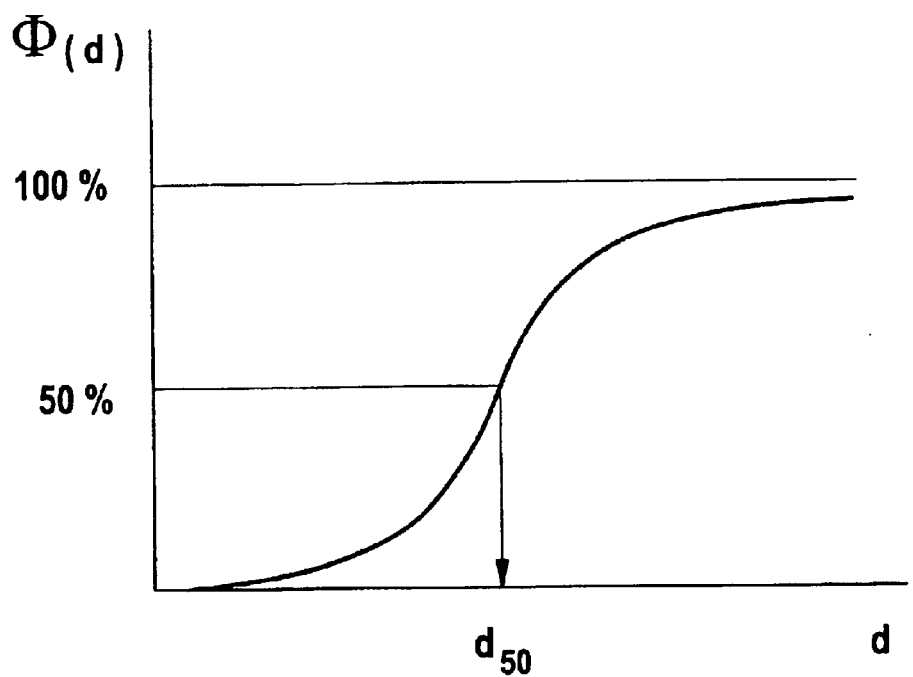
FIG. 1 is graphical representation of an exemplary particle size distribution illustrating the median particle diameter, $d_{50}$.

According to the invention, the object is achieved by providing a metalized or ceramic-coated, coextruded, biaxially oriented, sealable polyester film with at least one base layer (B), with a sealable outer layer (A), and with a metalized or ceramic-coated outer layer (C), where the sealable outer layer (A) has a minimum sealing temperature (fin) of not more than 110° C. and a seal seam strength (fin) of at least 1.3 N/15 mm of film width, and where the two outer layers (A) and (C) are characterized by the following features:

Sealable Outer Layer (A):

a) comprises particles of synthetic $SiO_2$ with a median particle diameter $d_{50}$ of from 2.5 to 10 µm,
b) comprises particles whose diameter has a SPAN98 which is smaller than or equal to 1.80,
c) comprises particles at a concentration of from 500 to 5 000 ppm,
d) has roughness $R_a$ greater than 60 nm,
e) has a side A/side A coefficient of friction smaller than 0.8.

Non-Sealable Metalized Outer Layer (C):

f) comprises particles substantially composed of synthetic $SiO_2$ with a median particle diameter $d_{50}$ of from 1.5 to 6 µm,
g) comprises particles whose diameter has a SPAN98 smaller than or equal to 2.0,
h) comprises particles at a concentration of from 1 000 to 5 000 ppm,
i) has roughness $R_a$ of from 30 to 150 nm,
j) has a side C/side C coefficient of friction smaller than 0.8.

DETAILED DESCRIPTION OF THE INVENTION

According to the invention, the film has at least three layers, the layers then present therein being the base layer (B), the sealable outer layer (A), and the non-sealable, metalized or ceramic-coated outer layer (C).

The base layer (B) of the film is preferably composed of at least 80% by weight of a thermoplastic polyester. Polyesters suitable for this purpose are those made from ethylene glycol and terephthalic acid (polyethylene terephthalate, PET), from ethylene glycol and naphthalene-2,6-dicarboxylic acid (polyethylene 2,6-naphthalate, PEN), from 1,4-bishydroxymethylcyclohexane and terephthalic acid (poly-1,4-cyclohexanedimethylene terephthalate, PCDT), or else made from ethylene glycol, naphthalene-2,6-dicarboxylic acid and biphenyl-4,4'-dicarboxylic acid (polyethylene 2,6-naphthalate bibenzoate, PENBB). Particular preference is given to polyesters at least 90 mol %, preferably at least 95 mol %, of which is composed of ethylene glycol units and terephthalic acid units, or of ethylene glycol units and naphthalene-2,6-dicarboxylic acid units. Preference is also given to mixtures (blends) composed of the abovementioned polymers, in particular blends which comprise polyethylene terephthalate and polyethylene 2,6-naphthalate. Within these, very particular preference is in turn given to those blends which comprise the abovementioned polymers and have semicrystalline character. The remaining monomer units derive from those other aliphatic, cycloaliphatic or aromatic diols and, respectively, dicarboxylic acids which can also be present in layer (A) or in layer (C).

Other examples of suitable aliphatic diols are diethylene glycol, triethylene glycol, aliphatic glycols of the formula HO—$(CH_2)_n$—OH, where n is an integer from 3 to 6 (in particular 1,3-propanediol, 1,4-butanediol, 1,5-pentanediol and 1,6-hexanediol) and branched aliphatic glycols having up to 6 carbon atoms. Among the cycloaliphatic diols, mention should be made of cyclohexanediols (in particular 1,4-cyclohexanediol). Examples of other suitable aromatic diols have the formula HO—$C_6H_4$—X—$C_6H_4$—OH, where X is —$CH_2$—, —$C(CH_3)_2$—, —$C(CF_3)_2$—, —O—, —S—or —$SO_2$—. Bisphenols of the formula HO—$C_6H_4$—$C_6H_4$—OH are also very suitable.

Other aromatic dicarboxylic acids are preferably benzenedicarboxylic acids, naphthalene dicarboxylic acids (such as naphthalene-1,4- or -1,6-dicarboxylic acid), biphenyl-x,x'-dicarboxylic acids (in particular biphenyl-4,4'-dicarboxylic acid), diphenylacetylene-x,x'-dicarboxylic acids (in particular diphenylacetylene-4,4'-dicarboxylic acid) or stilbene-x,x'-dicarboxylic acids. Among the cycloaliphatic dicarboxylic acids mention should be made of cyclohexanedicarboxylic acids (in particular cyclohexane-1,4-dicarboxylic acid). Among the aliphatic dicarboxylic acids, the $C_3$–$C_{19}$, alkanediacids are particularly suitable, and the alkane moiety here may be straight-chain or branched.

One way of preparing the polyesters is the transesterification process. Here, the starting materials are dicarboxylic esters and diols, which are reacted using the customary transesterification catalysts, such as the salts of zinc, of calcium, of lithium, of magnesium or of manganese. The intermediates are then polycondensed in the presence of well-known polycondensation catalysts, such as antimony trioxide or titanium salts. Another equally good preparation method is the direct esterification process in the presence of polycondensation catalysts. This starts directly from the dicarboxylic acids and the diols.

The sealable outer layer (A) coextruded onto the base layer (B) has a structure based on polyester copolymers and is substantially composed of copolyesters predominantly made of isophthalic acid units and of terephthalic acid units and of ethylene glycol units. The other monomer units derive from those other aliphatic, cycloaliphatic, or aromatic diols and, respectively, dicarboxylic acids which can also be present in the base layer. Preferred copolyesters which provide the desired sealing properties are those composed of ethylene terephthalate units and of ethylene isophthalate units, and of ethylene glycol units. The proportion of ethylene terephthalate is from 40 to 95 mol % and the corresponding portion of ethylene isophthalate is from 60 to 5 mol %. Preference is given to copolyesters where the proportion of ethylene terephthalate is from 50 to 85 mol % and the corresponding proportion of ethylene isophthalate is from 50 to 15 mol %, and highly preferred copolyesters are those where the proportion of ethylene terephthalate is from 60 to 80 mol % and the corresponding proportion of ethylene isophthalate is from 40 to 20 mol %.

For the other, non-sealable, metalized or ceramic-coated outer layer (C), or for any intermediate layers present, use is in principle made of those polymers described above for the base layer (B).

The desired sealing properties and the desired processing properties, in particular the desired performance of the film of the invention during coating in a vacuum, are obtained from the combination of the properties of the copolyesters used for the sealable outer layer and the topographies of the sealable outer layer (A) and the non-sealable, metalized or ceramic-coated outer layer (C).

The minimum sealing temperature (fin) of 110° C. and the seal seam strength (fin) of at least 1.3 N/15 mm of film width are achieved, for example, if the copolymers described in greater detail above are used for the sealable outer layer (A). The best sealing properties of the film are obtained if no other additives are added to the copolymer, in particular no inorganic or organic particles. Of course, in that case the handling of the film is poor, because the surface of the sealable outer layer (A) is highly susceptible to blocking. The film does not give good winding and is not very suitable for further processing on high-speed packaging machinery. A film of this type is completely unsuitable for processing on systems which operate with the aid of an applied vacuum. Due to the vacuum prevailing, the film is particularly susceptible to blocking. The individual plies of film are pressed onto one another by the vacuum (below $10^2$ Torr) and "stick" immediately if they do not have sufficient pigmentation. To improve the handling of the film, and the processability of the film on systems which utilize a vacuum, the sealable outer layer (A) has to be modified. This is best achieved with the aid of suitable antiblocking agents of selected size, a certain amount of these being added to the sealable layer, and specifically in such a way as firstly to minimize the blocking of the film and secondly to avoid substantial impairment of sealing properties. The desired properties of the film with respect to sealability and processability in a vacuum can be achieved if the sealable outer layer (A) is characterized by the following set of parameters:

a) According to the invention, the sealable outer layer (A) comprises particles (=antiblocking agents) of synthetic $SiO_2$ with a median particle diameter $d_{50}$ of from 2.5 to 10 μm.

Typical known antiblocking agents (also termed pigments) are inorganic and/or organic particles, such as calcium carbonate, amorphous silicate, talc, magnesium carbonate, barium carbonate, calcium sulfate, barium sulfate, lithium phosphate, calcium phosphate, magnesium phosphate, aluminum oxide, lithium fluoride, the calcium, barium, zinc, or manganese salts of the dicarboxylic acids used, carbon black, titanium dioxide, kaolin or crosslinked polystyrene particles, or crosslinked acrylate particles. The particles may be added to each of the layers in the respective advantageous concentrations, e.g. in the form of a glycolic dispersion during the polycondensation process, or by way of masterbatches during the extrusion process.

According to the present invention, however, these abovementioned antiblocking agents (except the amorphous silicate) are not preferred. Particles with spherical shape are likewise given low preference. These (spherical) particles have a tendency toward undesirable release from the film (chalking) during processing of the film, which implies exposure of the film to high mechanical load.

According to the invention, preferred particles are synthetically prepared, amorphous $SiO_2$ particles in colloidal form. These particles become extremely well bound into the polymer matrix and create only a few vacuoles (cavities). Vacuoles arise at the particles during the biaxial orientation process, and generally cause haze, and are therefore not very suitable for the present invention. The (synthetic) preparation of the $SiO_2$ particles (also termed silica gel) begins by mixing sulfuric acid and sodium silicate with one another under controlled conditions to form hydrosol. This finally forms a hard, transparent mass known as hydrogel. Once the sodium sulfate produced as by-product has been removed by washing, it can be dried and further processed on. The important physical parameters, e.g. pore volume, pore size, and the dimensions of the surface area of the resultant silica gel, may be varied via control of the pH of the washing water and of the drying conditions. The desired particle size (e.g. the $d_{50}$ value) and the desired particle size distribution (e.g. expressed by way of the SPAN98 scatter) are obtained by suitable milling of the silica gel (e.g. mechanically or hydromechanically). Examples of producers of these particles are the companies Grace, Fuji, Degussa, and Crosfield.

It has proven particularly advantageous to use particles with a particle diameter $d_{50}$ of from 2.5 to 10 µm, preferably from 2.8 to 8 µm, and particularly preferably from 3.1 to 6 µm. If particles with a diameter below 2.5 µm are used, haze increases (at comparable concentrations) and the susceptibility of the film to blocking becomes greater. Particles with diameter greater than 10 µm generally cause filter problems.

b) According to the invention, the sealable outer layer (A) comprises particles whose diameter has a scattering described by SPAN98≦1.8 (SPAN98 being as defined in test specification). SPAN98 is preferably≦1.7 and particularly preferably≦1.6. If, in contrast, the outer layer (A) of the film comprises a particle system in which the SPAN98 of the diameter is greater than 1.8, the optical properties and the sealing properties of the film become poorer.

c) According to the invention, the sealable outer layer (A) comprises particles at a concentration of from 500 to 5 000 ppm. The concentration of the particles is preferably from 800 to 4 000 ppm, and particularly preferably from 1 000 to 3 000 ppm. If, in contrast, the outer layer (A) of the film comprises a particle system in which the particles are present at a concentration of less than 500 ppm, it is in particular less suitable for processing in a vacuum. If, in contrast, the outer layer (A) of the film comprises a particle system in which the particles are present at a concentration of more than 5 000 ppm, the haze of the film becomes too great.

d) According to the invention, the roughness of the sealable outer layer, expressed via the $R_a$ value, is greater than 60 nm. The roughness $R_a$ is preferably greater than 80 nm, and particularly preferably greater than 100 nm. Otherwise, the film is less suitable for processing in a vacuum.

e) According to the invention, the sealable outer layer (A) has a side A/side A coefficient of friction smaller than 0.8. Preference is given to a coefficient of friction smaller than 0.75, and particular preference is given to a coefficient of friction smaller than 0.7. Otherwise, the film is less suitable for processing in a vacuum.

For further improvement in processing performance, in particular in the processing of the sealable film in a vacuum, the non-sealable, metalized or ceramic-coated outer layer (C) should be characterized by the following set of parameters:

a) According to the invention, the non-sealable, metalized or ceramic-coated outer layer (C) comprises particles of synthetically prepared, amorphous $SiO_2$ with a median particle diameter $d_{50}$ of from 1.5 to 6 µm. To achieve the object, it has proven particularly advantageous to use particles with a median particle diameter $d_{50}$ of from 2.0 to 5 µm, particularly from 2.5 to 4 µm.

b) According to the invention, the non-sealable, metalized or ceramic-coated outer layer (C) comprises particles whose diameter has a scatter described by SPAN98≦2.0. Preference is given to SPAN98≦1.9, and particular preference is given to SPAN98≦1.8. If, in contrast, the outer layer (C) of the film comprises a particle system in which the SPAN98 of the diameter is greater than 2.0, the optical properties of the metalized or ceramic-coated film become poorer.

c) According to the invention, the non-sealable, metalized or ceramic-coated outer layer (C) comprises particles at a concentration of from 1 000 to 5 000 ppm. The concentration of the particles is preferably from 1 200 to 4 000 ppm, and particularly preferably from 1 500 to 3 000 ppm. If, in contrast, the outer layer (C) of the film comprises a particle system in which the particles are present at a concentration of less than 1 000 ppm, it is less suitable for processing in a vacuum. If, in contrast, the outer layer (C) of the film comprises a particle system in which the particles are present at a concentration of more than 5 000 ppm, the gloss of the film becomes too low.

d) According to the invention, the roughness of the non-sealable, metalized or ceramic-coated outer layer, expressed via the $R_a$ value, is from 30 to 150 nm. Roughness $R_a$ is preferably from 35 to 130 nm, and particularly preferably from 40 to 110 nm. Otherwise, this surface is less suitable for processing in a vacuum.

e) According to the invention, the non-sealable, metalized or ceramic-coated outer layer (C) has a side C/side C coefficient of friction smaller than 0.8. Preference is given to a coefficient of friction smaller than 0.7, and particular preference is given to a coefficient of friction smaller than 0.6. Otherwise, the film is less suitable for processing in a vacuum, or, respectively, for further processing.

To achieve the abovementioned properties of the sealable film, it has proven advantageous for the amount of particles in the base layer (B) to be set lower than in the two outer layers (A) and (C). In the three-layer film of the abovementioned type, the amount of particles in the base layer (B) is advantageously to be from 0 to 0.15% by weight, preferably from 0 to 0.12% by weight, in particular from 0 to 0.10% by weight. It has proven particularly advantageous for the particles incorporated into the base layer to be only those which pass into the film by way of regrind of the same type of material. The optical properties of the film, in particular the gloss of the metalized or ceramic-coated film, are then particularly good.

In the advantageous usage form, the film is composed of three layers: the base layer (B) and outer layers (A) and (C) applied to the two sides of this base layer, the outer layer (A) being sealable with respect itself (fin sealing) and with respect to the outer layer (C) (in unmetalized and, respectively, non-ceramic-coated state) (lap sealing). The lap sealing here is generally somewhat poorer than the fin sealing. The minimum sealing temperature for lap sealing should not be above 120° C., and the seal seam strength should be at least 1.0 N/15 mm of film width. This is the case in the films of the invention.

Between the base layer and the outer layers there may, where appropriate, also be an intermediate layer. This may again be composed of the polymers described for the base layers. In one particularly preferred embodiment, the intermediate layer is composed of the polyesters used for the base layer. It may also comprise the conventional additives described below. The thickness of the intermediate layer is generally greater than 0.3 µm and is preferably in the range from 0.5 to 15 µm, particularly in the range from 1.0 to 10 µm, and very preferably in the range from 1.0 to 5 µm.

In the particularly advantageous three-layer embodiment of the film of the invention, the thickness of the outer layers A and C is generally greater than 0.5 µm and is preferably in the range from 0.55 to 6.0 µm, particularly preferably in the range from 0.6 to 5 µm, in particular in the range from 0.65 to 4 µm, and very particularly preferably in the range from 0.7 to 3 µm, and the thicknesses of the outer layers (A) and (C) here may be identical or different.

The total thickness of the polyester film of the invention may vary within certain limits.

It is from 3 to 100 µm, in particular from 4 to 80 µm, preferably from 5 to 60 µm, the proportion made up by the layer (B) preferably being from 45 to 90% of the total thickness.

The base layer and the other layers may also comprise conventional additives, such as stabilizers and other fillers. Their addition to the polymer or polymer mixture advantageously takes place prior to melting. Examples of stabilizers used are phosphorus compounds, such as phosphoric acid or phosphoric base esters.

The invention also provides a process for producing the polyester film of the invention by the coextrusion process known from the literature.

To produce the film, the polymers for the base layer (B) and the two outer layers (A) and (C) are fed to three extruders. Any foreign bodies or contamination present may be removed from the polymer melt by filtration prior to extrusion.

The melts corresponding to the individual layers (A), (B), and (C) of the film are then coextruded through a flat-film die and the resultant film is drawn off on one or more rollers for solidification. The film is then biaxially stretched (oriented), and the biaxially stretched film is heat-set and, where appropriate, corona- or flame treated on the surface intended for treatment.

As usual in the coextrusion process, the polymer or the polymer mixtures for the individual layers is/are first compressed and plastified in the respective extruders, and any additives provided may by this stage be present in the polymer or polymer mixture. The melts are then simultaneously extruded through a flat-film die (slot die), and the extruded multilayer melt is drawn off on one or more take-off rollers, whereupon the melt cools and solidifies to give a prefilm.

The biaxial orientation is generally carried out sequentially, preferably orienting the prefilm first longitudinally (i.e. in the machine direction=MD) and then transversely (i.e. perpendicularly to the machine direction=TD). This gives orientation of the polymer chains. One method of longitudinal orientation uses two rolls running at different speeds corresponding to the desired stretching ratio. For the transverse orientation, use is generally made of an appropriate tenter frame, by clamping both edges of the film and then subjecting it to bilateral tension at an elevated temperature.

The temperature at which the orientation is carried out may vary over a relatively wide range and depends on the film properties desired. The longitudinal stretching is generally carried out at from about 80 to 130° C., and the transverse stretching at from about 90 to 150° C. The longitudinal stretching ratio is generally in the range from 2.5:1 to 6:1, preferably from 3:1 to 5.5:1. The transverse stretching ratio is generally in the range from 3.0:1 to 5.0:1, preferably from 3.5:1 to 4.5:1. Prior to the transverse stretching, one or both surfaces of the film may be in-line coated by known processes. The in-line coating may serve, for example, to give improved adhesion of the metal layer, of the ceramic coating (the outer layer C being coated in this case), or of any printing ink subsequently to be applied, or else to improve antistatic performance or processing performance (coating of the sealable outer layer A also being possible in this case as an alternative).

In one preferred embodiment of the film of the invention, this is in-line coated using an aqueous dispersion, as described in EP-A-0 144 978, on side C, which is to be metalized or ceramic-coated. The polyester coating is composed of a condensation product of various derivatives capable of forming polyesters, e.g. isophthalic acid, aliphatic dicarboxylic acid, sulfomonomers, and aliphatic or cycloaliphatic glycol. The film then has very good adhesion to metals or ceramic coatings, and this is particularly advantageous for the present application.

In the heat-setting which follows, the film is held for from about 0.1 to 10 s at a temperature of from 150 to 250° C. The film is then wound up in a conventional manner.

One or both surfaces of the film is/are preferably corona- or flame-treated by one of the known methods after biaxial stretching. The intensity of treatment is generally in the range above 50 mN/m.

The metal layer or ceramic layer is advantageously applied on well-known industrial systems. Metal layers composed of aluminum are usually produced by deposition from the vapor, whereas the production of ceramic layers may use not only that process but also electron-beam processes or sputtering. The process parameters for the system during application of the metal layer or ceramic layer to the film are the standard conditions. The method of metalizing the films is preferably such that the optical density of the metalized films is in the range from about 0.3 to 3.4. The manner of applying the ceramic layer to the film is such that the thickness of the oxide layer is preferably in the range from 30 to 200 nm. For all settings of variables, the web speed of the film to be coated is from 2 to 10 m/s.

The metal layer is preferably composed of aluminum. However, other materials which can be applied in the form of a thin, coherent layer are also suitable. Silicon is particularly suitable, for example, and, unlike aluminum, gives a transparent layer. The ceramic layer is preferably composed of oxides of elements of the $2^{nd}$, $3^{rd}$, or $4^{th}$ main group of the periodic table, in particular of magnesium oxide, aluminum oxide, or silicon oxide. Use is generally made of those metallic or ceramic materials which can be applied at markedly reduced pressure or in a vacuum. The thickness of the layer applied is generally from 10 to 200 nm.

The film may also be coated in order to establish other desirable properties. Typical coatings have adhesion-promoting, antistatic, slip-improving, or release action. Clearly, these additional layers may be applied to the film via in-line coating by means of aqueous dispersions prior to the stretching step in the transverse direction.

Clearly, it is also particularly advantageous for the outer layer C of the film to be plasma-pretreated directly prior to the metalization or the coating with ceramic materials (in-line). The plasma pretreatment takes place in the same operation as the metalization or the coating with ceramic materials, but precedes the main coating process. The reactor gas used may be argon or oxygen, for example, or else a mixture of the two substances. The plasma pretreatment likewise achieves better adhesion to the coating applied.

The film of the invention has excellent sealability, very good handling properties, and very good processing performance, in particular during processing in a vacuum. The sealable outer layer (A) of the film seals not only with respect to itself (fin sealing), but also with respect to the non-sealable outer layer (C) (lap sealing).

In addition, it was possible to make a marked improvement in the haze of the (unmetalized) film. The haze of the (unmetalized) film of the present invention is less than 3.0%, preferably less than 2.7%, and particularly preferably less than 2.5%. Furthermore, it has been ensured that cut material (regrind) can be reintroduced to the extrusion process during production of the film in amounts in the range from 10 to 60% by weight, based on the total weight of the film, without any significant adverse effect on the physical properties of the film, in particular on its appearance.

The film therefore has excellent suitability for use in flexible packaging, and indeed particularly wherever its excellent sealing properties and its good processability are of great importance. This applies in particular to its use in vacuum-coating processes, or in the processing steps downstream of vacuum-coating processes.

The following table (table 1) gives the most important film properties of the invention again at a glance.

For the purposes of the present invention, the following test methods were utilized to characterize the raw materials and the films:

Optical Density

To measure optical density, the TD-904 densitometer from Macbeth (Division of Kollmorgen Instruments Corp.) was used. Optical density is defined as $OD=-lg\ 1/l_0$ where l is the density of incident light, $l_0$ is the intensity of emitted light, and $1/l_0$ is transmittance.

Measurement of Median Diameter $d_{50}$

Median diameter $d_{50}$ was determined by laser scanning on a Malvern Mastersizer (examples of other test equipment being the Horiba LA 500 or Sympathec Helos, which use the same principle of measurement). For this, the specimens were placed in a cell with water and this was then inserted into the test equipment. The dispersion is scanned by the laser, and particle size distribution is determined from the signal by comparison with a calibration curve. The particle size distribution has two characterizing parameters, the median value $d_{50}$ (=a measure of the position of the median) and the scatter, termed the SPAN98 (=a measure of the scattering of particle diameter). The test procedure is automatic, and also includes the mathematical determination of the $d_{50}$ value. The $d_{50}$ value is determined here in accordance with its definition from the (relative) cumulative particle size distribution curve: the point of intersection of the 50% ordinate value with the cumulative curve gives the desired $d_{50}$ value (also termed median, cf. FIG. 1) on the abscissa axis.

TABLE 1

| | Range of the invention | Preferred | Particularly preferred | Unit | Test method |
|---|---|---|---|---|---|
| Outer layer A | | | | | |
| Minimum sealing temperature (fin sealing) | <110 | <108 | <105 | °C. | internal |
| Minimum sealing temperature (lap sealing) | <120 | <118 | <115 | °C. | internal |
| Seal seam strength (fin sealing) | ≧1.3 | >1.4 | >1.5 | N/15 mm | internal |
| Seal seam strength (lap sealing) | ≧1.0 | >1.1 | >1.2 | N/15 mm | internal |
| Outer layer thickness | >0.5 | 0.55–6 | 0.6–5 | μm | |
| Particle diameter $d_{50}$ | 2.5–10 | 2.8–8 | 3.1–6 | μm | internal |
| SPAN98 scattering | ≧1.8 | ≧1.7 | ≧1.6 | — | internal |
| Filler concentration | 500–5000 | 800–4000 | 1000–3000 | ppm | internal |
| Average roughness $R_a$ | >60 | >80 | >100 | nm | DIN 4768, cut-off at 0.25 mm |
| A/A COF | <0.8 | <0.75 | <0.7 | | DIN 53375 |
| Gloss, 20° | >120 | >130 | >140 | | DIN 67530 |
| Metalized outer layer C | | | | | |
| Outer layer thickness | >0.5 | 0.55 to 6 | 0.6 to 5 | μm | |
| Particle diameter $d_{50}$ | 1.5 to 6 | 2.0 to 5 | 2.5 to 4 | μm | internal |
| SPAN98 scattering | ≧2.0 | ≧1.9 | ≧1.8 | — | internal |
| Filler concentration | 1000–5000 | 1200–4000 | 1500–3000 | ppm | internal |
| Average roughness $R_a$ | 30 to 150 | 35 to 130 | 40 to 110 | nm | DIN 4768,Cut off at 0.25 mm |
| C/C COF | <0.8 | <0.7 | <0.6 | | DIN 53375 |
| Gloss 20° | >120 | >130 | >140 | | DIN 67530 |
| Other film properties | | | | | |
| Haze of unmetalized film | <3.0 | <2.7 | <2.5 | % | ASTM D1003-52 |

Measurement of SPAN98

The test equipment used to determine scatter, SPAN98, was the same as that described above for the determination of median diameter $d_{50}$. The measure of scattering, SPAN98, is defined here as follows:

$$SPAN98 = \frac{d_{98} - d_{10}}{d_{10}}.$$

Figure 2:
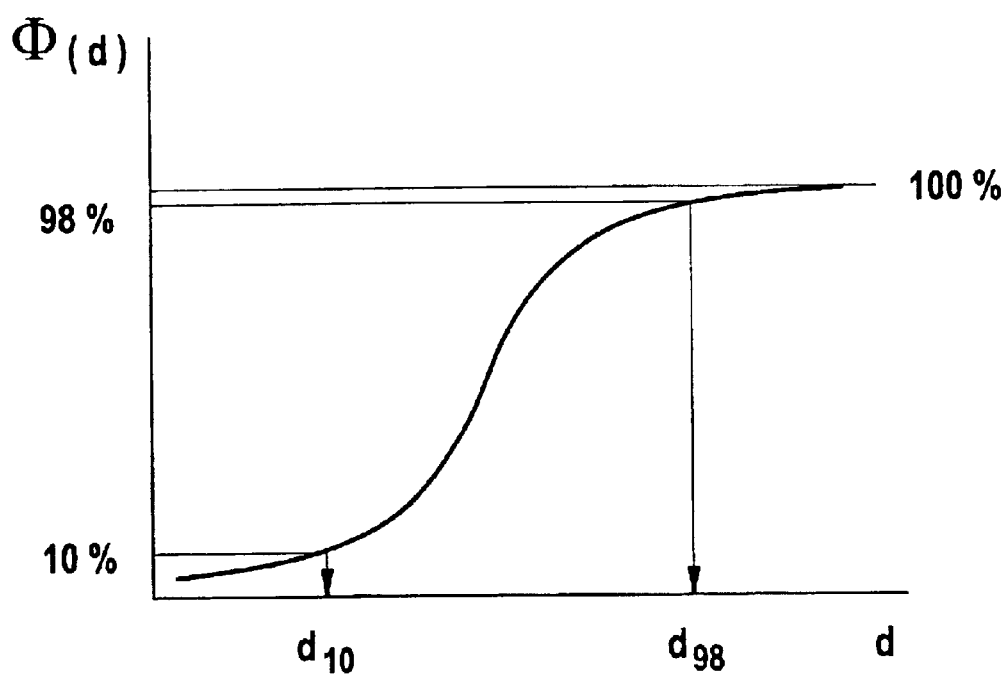
FIG. 2 is a graphical representation of an exemplary particle size distribution illustrating $d_{10}$ and $d_{98}$ values use to calculate the SPAN 98 scatter.

Determination of $d_{98}$ and $d_{10}$ is in turn based on the (relative) cumulative particle size distribution curve. The point of intersection of the 98% ordinate value directly gives the desired $d_{98}$ value on the abscissa axis, and the point of intersection of the 10% ordinate value of the cumulative curve with the curve gives the desired $d_{10}$ value on the abscissa axis (cf. FIG. 2).

SV (Standard Viscosity)

Standard viscosity SV (DCA) is measured in dichloroacetic acid by a method based on DIN 53726.

Seal Seam Strength

Figure 3:
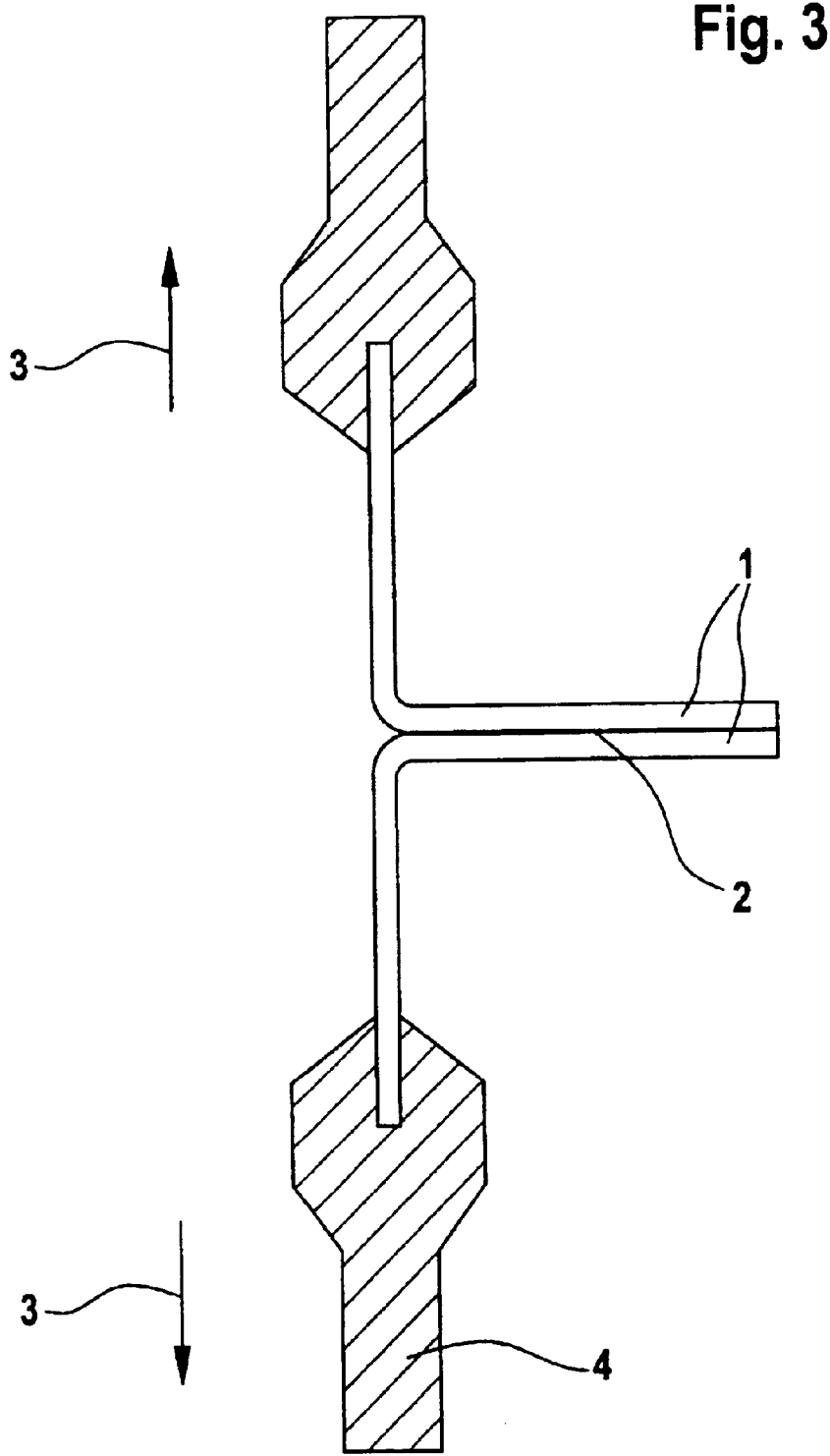
FIG. 3 is schematic representation illustrating the film configuration used in determining seam seal strength.

To determine seal seam strength, two pieces of film (1) (100 mm×100 mm) are placed one on top of the other and sealed at 130° C. with a sealing time of 0.5 s and a sealing pressure of 2 bar (HSG/ET sealer from Brugger, bilaterally heated sealing jaws, seal seam (2) 10 mm×100 mm). Test strips of width 15 mm were cut from the sealed specimens. The seal seam strength, i.e. the force (3) needed to separate the test strips, is determined using a tensile testing machine (e.g. Zwick) at a separation velocity of 200 mm/min., the plane of the seal seam being at right angles to the direction of tension [cf. FIG. 3; with claw (4)]. Seal seam strength is given in N per 15 mm film strip (e.g. 3N/15 mm).

Determination of Minimum Sealing Temperature

Hot-sealed specimens (seal seam 10 mm×100 mm) were produced as described above under measurement of seal seam strength using a Brugger HSG/ET sealer apparatus, by sealing the film at different temperatures with the aid of two heated sealing jaws at a sealing pressure of 2 bar and with a sealing time of 0.5 s. From the sealed specimens, test strips of 15 mm width were cut. The minimum sealing temperature is the temperature at which a seal seam strength of at least 0.5 N/15 mm is achieved. Seal seam strength was measured as in the determination of seal seam strength.

Roughness

Roughness $R_a$ of the film was determined to DIN 4768 with a cut-off of 0.25 mm. This measurement was not made on a glass plate but in a ring. In the ring method, the film is clamped into a ring in such a way that neither of the two surfaces is in contact with a third surface (e.g. glass).

Coefficient of Friction (COF)

Coefficient of friction was determined to DIN 53375. Coefficient of sliding friction was measured 14 days after production.

Surface Tension

Surface tension was determined by what is known as the ink method (DIN 53 364).

Haze

Hölz haze was measured by a method based on ASTM D1003-52 but, in order to utilize the most effective measurement range, measurements were made on four pieces of film laid one on top of the other, and a 1° slit diaphragm was used instead of a 4° pinhole.

Gloss

Gloss was determined to DIN 67 530. Reflectance was measured, as an optical value characteristic of a film surface. Based on the standards ASTM D523-78 and ISO 2813, the angle of incidence was set at 20°. A beam of light hits the flat test surface at the set angle of incidence and is reflected and/or scattered thereby. A proportional electrical variable is displayed representing light rays hitting the photoelectronic detector. The value measured is dimensionless and must be stated together with the angle of incidence.

The invention is further illustrated below examples.

EXAMPLE 1

Chips made from polyethylene terephthalate (produced by the transesterification process using Mn as transesterification catalyst, Mn concentration: 100 ppm) were dried at 150° C. to residual moisture below 100 ppm, and fed to the extruder for the base layer (B). Similarly, chips made from polyethylene terephthalate and particles were fed to the extruder for the non-sealable outer layer (C).

In addition to this, chips were produced from a linear polyester composed of an amorphous copolyester comprising 78 mol % of ethylene terephthalate and 22 mol % of ethylene isophthalate (prepared by the transesterification process using Mn as transesterification catalyst, Mn concentration: 100 ppm). The copolyester was dried at a temperature of 100° C. to residual moisture below 200 ppm and fed to the extruder for the sealable outer layer (A).

Coextrusion followed by stepwise longitudinal and transverse orientation was then used to produce a transparent, three-layer film with ABC structure and a total thickness of 12 μm. The thickness of each of the outer layers is found in table 2.

Outer layer (A) was a mixture of:

| Outer layer (A) was a mixture of: | |
|---|---|
| 96.0% by weight of | copolyester with SV of 800 |
| 4.0 by weight of | Masterbatch made from 95% by weight of copolyester (SV of 800) and 5.0% by weight of ® Sylysia 430 (synthetic SiO$_2$ from Fuji, Japan); SPAN98 = 1.7 |
| Base layer (B): | |
| 100.0% by weight | of polyethylene terephthalate with SV of 800 |
| Outer layer (C) was a mixture of: | |
| 85% by weight | of polyethylene terephthalate with SV of 800 |
| 15% by weight | of Masterbatch made from 99% by weight of polyester (SV of 800) and 1.0% by weight of Sylobloc 44 H (synthetic SiO$_2$ from Grace), SPAN98 = 1.9 |

The production conditions in each of the steps of the process were:

| | | | | |
|---|---|---|---|---|
| Extrusion | Temperatures | Layer A: | 270 | ° C. |
| | | Layer B: | 290 | ° C. |
| | | Layer C: | 290 | ° C. |
| | Temperature of take-off roller | | 30 | ° C. |
| Longitudinal stretching | Heating temperature | | 80–125 | ° C. |
| | Stretching temperature | | 122 | ° C. |
| | Longitudinal stretching ratio | | 4.2 | |
| Transverse stretching | Heating temperature | | 100 | ° C. |
| | Stretching temperature | | 135 | ° C. |
| | Transverse stretching ratio | | 4.0 | |
| Setting | Temperature | | 230 | ° C. |
| | Duration | | 3 | s |

The film had the required good sealing properties and the desired handling properties, and the desired processing performance, in particular the processing performance on systems which operate in a vacuum. The film was coated on a commercially available vacuum-coating system (Top Beam) from Applied/Hanau, using $SiO_x$ with standard parameters. The thickness of the $SiO_x$ layer was 200 nm and the coating speed was 300 m/min. The structure of the film and the properties achieved in films produced in this way are shown in tables 2 and 3.

EXAMPLE 2

Using example 1 as the basis, the outer layer thickness for the sealable layer (A) was raised from 1.5 to 2.5 μm, while the structure of the film and the method of production were otherwise identical. There was a resultant improvement in sealing properties, and in particular a marked increase in seal seam strength. The film had the required sealing properties and the desired handling properties, and the desired processing performance on systems which operate in a vacuum. The film was coated in a vacuum as in example 1.

EXAMPLE 3

Using example 1 as a basis, a film of thickness 20 μm was now produced. The outer layer thickness for the sealable layer (A) was 3.0 μm, and that for the non-sealable layer (C) was 2.0 μm. Again, there was a resultant improvement in sealing properties, in particular a marked increase in seal seam strength. The film had the required sealing properties and the desired handling properties, and the desired processing performance on systems which operate in a vacuum. The film was coated in a vacuum as in example 1.

EXAMPLE 4

Using examples 3 as a basis, the copolymer for the sealable outer layer (A) was changed. Instead of the amorphous copolyester having 78 mol % of polyethylene terephthalate and 22 mol % of ethylene isophthalate, use was now made of an amorphous copolyester having 70 mol % of polyethylene terephthalate and 30 mol % of ethylene isophthalate. The outer layer thickness for the sealable layer (A) was again 3 μm, and that for the non-sealable layer (C) was 2.0 μm. There was a further improvement in sealing properties, in particular a marked improvement in seal seam strength. To achieve good handling properties and good processing performance of the film, the concentration of particles in the two outer layers was slightly raised. The film was coated in a vacuum as in example 1.

Comparative Example 1

Using example 1 as a basis, an unpigmented sealable outer layer (A) (comprising no particles) was now used. Although there was a resultant improvement in sealing properties, there was an unacceptable deterioration in the handling properties of the film and in processing performance. The film was coated in a vacuum as in example 1. During this process severe blocking occurred between the coated side (C) and the sealable side (A). Due to relatively large amounts of ceramic transfer (from the outer layer (C) to the outer layer (A)), further processing of the film was impossible.

Comparative Example 2

Example 1 from EP-A-0 035 835 was repeated. The sealing performance of the film, the handling properties of the film, and the processing performance of the film are poorer than in the examples of the invention. The film was coated in a vacuum as in example 1. In addition, the film had poor haze.

Comparative Example 3

Example 1 of EP-A-0 515 096 was repeated. The processing performance of the film in a vacuum is poorer than for the films of the invention. The film was coated in a vacuum as in example 1. In addition, the haze of the film was unsatisfactory.

Comparative Example 4

Example 21 of EP-A-0 379 190 was repeated. The processing performance of the film in a vacuum is markedly poorer than for the examples of the invention. The film was coated in a vacuum as in example 1.

TABLE 2

| Example | Film thickness μm | Film structure | Layer thickness μm | | | Particles in layers | | | Median particle diameter in layers μm | | | Particle concentrations ppm | |
|---|---|---|---|---|---|---|---|---|---|---|---|---|---|
| | | | A | B | C | A | B | C | A | B | C | A | B |
| E 1 | 12 | ABC | 1.5 | 9 | 1.5 | Sylysia 430 | None | Sylobloc 44 H | 3.4 | | 2.5 | 2000 | 0 1500 |
| E 2 | 12 | ABC | 2.5 | 8.0 | 1.5 | Sylysia 430 | None | Sylobloc 44 H | 3.4 | | 2.5 | 2000 | 0 1500 |
| E 3 | 20 | ABC | 3.0 | 15.0 | 2.0 | Sylysia 430 | None | Sylobloc 44 H | 3.4 | | 2.5 | 2000 | 0 1500 |
| E 4 | 20 | ABC | 3.0 | 15.0 | 2.0 | Sylysia 430 | None | Sylobloc 44 H | 3.4 | | 2.5 | 2500 | 0 2000 |
| CE 1 | 12 | ABC | 1.5 | 9 | 1.5 | None | None | Sylobloc 44 H | | | 2.5 | | 0 1500 |
| CE 2 | 15 | AB | 2.25 | 12.75 | | Gasil 35 | None | | 3 | | | 2500 | 0 0 |
| CE 3 | 15 | AB | 3.00 | 12.00 | | Aerosil K330 | None | | 0.04 | | | 8000 | 0 0 |
| CE 4 | 11.5 | AB | 2.50 | 9.00 | | Silica | None | | 2.0 | | | 5000 | 400 0 |

TABLE 3

| Examples | Minimum sealing temperature °C. fin | Minimum sealing temperature °C. lap | Seal seam strength N/15 mm fin | Seal seam strength N/15 mm lap | Coefficient of friction COF A/A | Coefficient of friction COF C/C | Average roughness $R_a$ nm Side A | Average roughness $R_a$ nm Side C | Haze % | Gloss (20°) Side A | Gloss (20°) Side C | Winding performance and handling properties | Processing performance |
|---|---|---|---|---|---|---|---|---|---|---|---|---|---|
| E 1 | 90 | 110 | 2.9 | 2.4 | 0.58 | 0.44 | 143 | 85 | 1.9 | 166 | 157 | ++ | ++ |
| E 2 | 90 | 108 | 4.2 | 2.7 | 0.65 | 0.44 | 123 | 85 | 2.1 | 160 | 180 | ++ | ++ |
| E 3 | 90 | 108 | 4.4 | 2.7 | 0.65 | 0.44 | 123 | 85 | 2.1 | 160 | 180 | ++ | ++ |
| E 4 | 90 | 105 | 4.7 | 3.4 | 0.58 | 0.43 | 146 | 95 | 2.3 | 170 | 175 | ++ | ++ |
| CE 1 | 90 | 110 | 3.2 | 2.6 | >1 | 0.44 | 20 | 85 | 1.7 | 185 | 180 | − | − |
| CE 2 | 105 | − | 0.97 | | 0.49 | | 70 | 20 | 22.5 | 140 | | − | − |
| CE 3 | 103 | − | 4.125 | | 0.63 | >1 | ≈25 | 20 | 2.7 | 140 | | − | − |
| CE 4 | 100 | − | 4 | | 0.65 | 0.8 | ≈65 | 30 | 1.5 | 140 | | − | − |

Key to winding performance, handling properties, and processing performance of films:
++: no tendency to stick to rollers or to other mechanical parts, no blocking problems on winding or during processing on packaging machinery, low production costs
+: moderate production costs
−: tendency to stick to rollers or to other mechanical parts, blocking problems on winding and during processing on packaging machinery, high production costs due to complicated handling of the film in the machinery

What is claimed is:

1. A coextruded, biaxially oriented, sealable polyester film with at least one base layer (B), with a sealable outer layer (A) on one surface of the base layer (B), and with a metalized or ceramic-coated outer layer (C) on the other surface of the base layer (B), where the sealable outer layer (A) has a minimum sealing temperature (fin) of not more than 110° C. and a seal seam strength (fin) of at least 1.3 N/15 mm of film width, and where the two outer layers (A) and (C) are characterized by the following features:

sealable outer layer (A):
a) comprises particles composed of synthetic $SiO_2$ at a concentration of from about 500 to about 5000 ppm, with a median particle diameter $d_{50}$ of from about 2.5 to about 10 μm, the SPAN98 of the diameter being less than or equal to 1.80, and has a roughness $R_a$ greater than 60 nm,
b) has a side A/side A coefficient of friction which is smaller than 0.8, and non-sealable outer layer (C):
c) comprises particles composed of synthetic and amorphous $SiO_2$ at a concentration of from above 1000 to about 5000 ppm with a median particle diameter $d_{50}$ of from 1.5 to about 6 μm, the SPAN98 of the diameter being less than or equal to 2.0,
d) has a roughness $R_a$ such that $30 \leq R_a \leq 150$ nm,
e) has a side C/side C coefficient of friction which is smaller than 0.6,
f) is coated with a metal or ceramic material.

2. The sealable polyester film as claimed in claim 1, wherein the sealable outer layer (A) comprises an amorphous copolyester which is composed of ethylene terephthalate units and of ethylene isophthalate units, and of ethylene glycol units.

3. The sealable polyester film as claimed in claim 2, wherein the amorphous copolyester of the sealable outer layer (A) contains from about 40 to about 95 mol % of ethylene terephthalate and from about 60 to about 5 mol % of ethylene isophthalate.

4. The sealable polyester film as claimed in claim 1, wherein the thickness of the sealable outer layer (A) is greater than 0.5 μm.

5. The sealable polyester film as claimed in claim 1, whose haze in the unmetalized state is less than 3.0.

6. The sealable polyester film as claimed in claim 1, wherein the amount of particles in the base layer (B) is smaller than in the two outer layers (A) and (C).

7. A process for producing a sealable polyester film as claimed in claim 1, in which the polymers for the base layer (B) and the two outer layers (A) and (C) are fed to separate extruders, any foreign body or contamination present is removed from the polymer melt by suitable filters prior to extrusion, and the melts are then shaped within a coextrusion die to give flat melt films and are brought in contact with one another to form layers, and then the multilayered film is drawn off with the aid of a chill roll and is solidified, and then is biaxially stretch-oriented and heat-set, the biaxial stretching being carried out sequentially by first stretching longitudinally (in machine direction) and then transversely (perpendicularly to machine direction), which comprises carrying out the longitudinal stretching at a temperature in the range from about 80 to about 130° C. and the transverse stretching in the range from about 90 to about 150° C., and comprises using a longitudinal stretching ratio in the range from about 2.5:1 to about 6:1 and a transverse stretching ratio in the range from about 3.0:1 to about 5.0:1.

8. The process as claimed in claim 7, wherein, after the longitudinal stretching and prior to the transverse stretching, one or both surfaces of the film is or are coated by the in-line method.

9. The method of making a packaging film which method comprises converting a film as claimed in claim 1 into a packaging film.

* * * * *